United States Patent
Kojima et al.

[11] Patent Number: 5,811,064
[45] Date of Patent: Sep. 22, 1998

[54] POISONING RESISTANT CATALYST FOR EXHAUST GAS CONVERTERS

[75] Inventors: Takao Kojima; Ken Minoha; Masaru Yamano, all of Aichi, Japan

[73] Assignee: NGK Spark Plug Co., Ltd., Aichi, Japan

[21] Appl. No.: 340,434

[22] Filed: Nov. 14, 1994

Related U.S. Application Data

[60] Continuation of Ser. No. 157,423, Nov. 26, 1993, abandoned, which is a division of Ser. No. 35,495, Mar. 19, 1993, Pat. No. 5,316,738, which is a continuation of Ser. No. 640,349, Jan. 11, 1991, abandoned.

[30] Foreign Application Priority Data

Jan. 12, 1990 [JP] Japan ................................ 2-5672
Aug. 6, 1990 [JP] Japan ................................ 2-208373

[51] Int. Cl.$^6$ ..................................................... B01D 53/34
[52] U.S. Cl. .......................... 422/180; 422/177; 422/211; 422/222; 502/527.12; 502/527.15; 502/103; 502/340
[58] Field of Search ..................... 422/171, 180, 422/177, 211, 222; 502/304, 103, 340, 328, 527.12, 527.15; 423/213.5; 60/299; 55/DIG. 30

[56] References Cited

U.S. PATENT DOCUMENTS

| | | | |
|---|---|---|---|
| 3,409,390 | 11/1968 | Hoekstra | 423/213.5 |
| 3,806,582 | 4/1974 | Acres et al. | 423/239 |
| 3,931,050 | 1/1976 | Asano et al. | 423/213.5 |
| 3,969,082 | 7/1976 | Cairns et al. | 422/180 |
| 4,040,797 | 8/1977 | Young | 44/68 |
| 4,072,471 | 2/1978 | Morgan, Jr. et al. | 422/180 |
| 4,080,179 | 3/1978 | Boyer | 44/51 |
| 4,118,119 | 10/1978 | Volker et al. | 422/171 |
| 4,134,733 | 1/1979 | Volker et al. | 422/180 |
| 4,289,737 | 12/1981 | Acres et al. | 423/245 |
| 4,388,275 | 6/1983 | Fratzer et al. | 422/180 |
| 4,407,785 | 10/1983 | Pfefferle | 423/212 |
| 4,415,537 | 11/1983 | Vine et al. | 422/180 |
| 4,675,308 | 6/1987 | Wan et al. | 502/304 |
| 4,678,770 | 7/1987 | Wan et al. | 502/304 |
| 4,738,947 | 4/1988 | Wan et al. | 502/304 |
| 5,071,807 | 12/1991 | Kennedy et al. | 502/340 |
| 5,248,650 | 9/1993 | Sekiba et al. | 502/304 |

FOREIGN PATENT DOCUMENTS

| | | |
|---|---|---|
| 448295 | 4/1974 | Australia . |
| 0013243 | 7/1980 | European Pat. Off. .......... C10L 1/10 |
| A-161743 | 11/1985 | European Pat. Off. . |
| 0324475 | 5/1989 | European Pat. Off. . |
| B-2045488 | 4/1971 | Germany . |
| 55-79046 | 6/1980 | Japan . |
| 55-167046 | 12/1980 | Japan . |
| A-2142253 | 1/1958 | United Kingdom . |

OTHER PUBLICATIONS

Power. vol. 126, No.3, Mar. 1982, pp. 84—87, T.C. Elliott "Fireside Additives Boost Boiler Efficiency and Reliability".

*Primary Examiner*—Hien Tran
*Attorney, Agent, or Firm*—Sughrue, Mion, Zinn, Macpeak & Seas, PLLC

[57] ABSTRACT

A poisoning-resistant catalyst for a catalytic converter, includes a support, a noble metal catalytic component deposited on the support, and a poisoning-preventive layer formed on the side of the catalytic component exposed to an exhaust gas, said poisoning-preventive layer having a compound containing at least one element selected from the Group IIa elements of the periodic table.

3 Claims, 2 Drawing Sheets

POISONING RESISTANT CATALYST FOR EXHAUST GAS CONVERTERS

This is a continuation of application Ser. No. 08/157,423 filed Nov. 26, 1993, now abandoned, in turn a divisional application of U.S. application Ser. No. 08/035,495, filed Mar. 19, 1993, now U.S. Pat. No. 5,316,738, in turn, a continuation application of U.S. application Ser. No. 07/640,349, filed Jan. 11, 1991, now abandoned.

FIELD OF THE INVENTION

The present invention relates to a poisoning-preventive layer-possessing support for preventing a catalyst from poisoning by silicon or phosphorus, and also relates to a catalyst having resistance to poisoning by silicon or phosphorus, an exhaust gas converter device, which employs noble metals, such as Pt and Rh, as catalytic components and which are used for cleaning automotive exhaust gases or digestion gases resulting from sludge digestion (the two kinds of gases being hereinafter inclusively referred to as exhaust gases), and a poisoning-preventive gasoline composition.

BACKGROUND OF THE INVENTION

Automotive exhaust gas catalytic converters are commonly used in automobiles to prevent environmental pollution because the catalytic converters greatly reduce air pollutants such as carbon monoxide, nitrogen oxides, etc. without lowering the output and fuel efficiency of the engines.

With recent improvements in the combustion systems in engines, the concentrations of unburned ingredients in exhaust gases have become low. As a result, catalytic converters are now mainly employed. Catalysts for use in these catalytic converters include an oxidation catalyst, a reduction catalyst, and a three-way catalyst, each consisting of a ceramic support of the pellet or monolith-type and a particular catalytic component deposited on the support. Such catalytic components include, for example, noble metals such as Pt, Rh, etc.

Catalytic converters are also used in industrial engines (e.g., engines for use with digestion gases formed by the digestion of organic sludges such as sewage sludges).

However, the known catalytic converters have the following problem. Silicon (including various Si-containing compounds), for example, siloxane gas ($Si(CH_3)_nO$ or $(CH_3)_2SiO$) and phosphorus, for example, phosphoric acid and phosphate (such as $H_3PO_4$, $HPO_3$ and $H_4P_2O_7$) are often present in exhaust gases, mainly because silicones or the like are used in large quantities as sealing materials, i.e., formed in-place gasket (FIPG) for present-day automotive parts and phosphorus is contained in oils. Further, sand and dust, dispersed in the air, may come into the intake air and be introduced into the engine. In the case of engines used with digestion gases, there are also situations where Si and phosphorus enter into the fuel. Because of Si and phosphorus, the noble metals, such as Pt and Rh, used as catalytic components are likely to be poisoned or clogged. This poisoning or clogging greatly impairs the catalyst function.

SUMMARY OF THE INVENTION

The present inventors have conducted intensive studies of catalyst poisoning prevention. As a result, it has now been found that poisoning by Si and phosphorus contained in exhaust gases can be considerably diminished by incorporating a compound containing a Group IIa element of the periodic table (hereinafter Group IIa element) into a poisoning-preventive layer provided on the side exposed to exhaust gases, particularly into a poisoning-preventive layer as the uppermost layer, thereby eliminating the above-described problem.

Accordingly, an object of the present invention is to provide a poisoning-resistant catalyst in which a noble metal catalytic component is prevented from being poisoned by Si and phosphorus and which can therefore retain its catalytic performance over a prolonged period of time.

Another object of the present invention is to provide a support having a poisoning-preventive layer.

Still another object of the present invention is to provide an exhaust gas converter device.

A further object of the present invention is to provide a poisoning-preventive gasoline composition.

These and other objects of the present invention are achieved by a poisoning-preventive layer-possessing support comprising a support and, formed thereon, a poisoning-preventive layer having a compound containing at least one element selected from the Group IIa elements of the periodic table; a poisoning-resistant catalyst for a catalytic converter, which comprises a support, a noble metal catalytic component deposited on the support, and a poisoning-preventive layer formed on the side of the catalytic component exposed to an exhaust gas, said poisoning-preventive layer having a compound containing at least one element selected from the Group IIa elements of the periodic table; an exhaust gas converter device comprising a poisoning-preventive material provided on the exhaust gas inlet side, said poisoning-preventive material being either a ceramic material or the poisoning-preventive layer-possessing support as described above, said ceramic material comprising a compound containing at least one element selected from the Group IIa elements of the periodic table or comprising said compound and other ceramic compounds, and a catalyst provided on the exhaust gas outlet side, said catalyst comprising a support and a noble metal catalytic component deposited on the support; and a poisoning-preventive gasoline composition comprising a gasoline and a compound containing at least one element selected from the Group IIa elements of the periodic table.

DETAILED DESCRIPTION OF THE INVENTION

Figure 1:
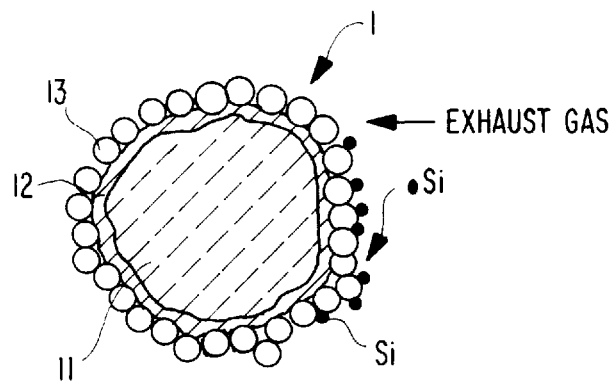
FIG. 1 is a sectional view of the pellet-type catalyst prepared in an Example, as one form of the catalyst of this invention.

In a first aspect of this invention, a poisoning-preventive layer-possessing support is provided which comprises a support and a poisoning-preventive layer formed thereon, having a compound containing at least one element selected from the Group IIa elements of the periodic table.

This poisoning-preventive layer-possessing support, on which a catalytic component is not supported, functions to prevent the catalytic activity of the catalyst from being reduced due to poisoning by Si and phosphorus, when located on the upstream side of the catalyst. If an ordinary catalyst is used and the poisoning-preventive layer-possessing support is not used therewith, Si and phosphorus adhere to the surfaces of the noble metal present on the catalyst and reduce the activity of the noble metal. In some instances, the Si and phosphorus cover the noble metal surfaces, making the catalytic component less likely to come into contact with exhaust gases or causing partial clogging. Accordingly, since converting efficiency may be adversely affected particularly in the initial stage of use, use of an ordinary catalyst alone is inferior with respect to manufacture control.

Such an adverse effect on the initial converting efficiency of a catalyst can be reduced by locating the poisoning-preventive layer-possessing support of this invention on the upstream side of the catalyst. This support exhibits an excellent effect when its volume is ⅕ or more of the volume of the catalyst (or converter). In the case where this support is in the form of pellets, their sizes preferably are about 2 to 5 mmφ. If the pellet sizes are less than 2 mmφ, the volume of the spaces between the pellets is too small, so that it is difficult for exhaust gases to pass through the pellets. If the pellet sizes exceed 5 mmφ, the space volume becomes so large that the effect of the support is reduced.

As in the catalyst, described below, the poisoning-preventive layer-possessing support may have a shape and a support material, such as those described below, and employs a Group IIa element compound such as those described below. For example, the support may consist of dolomite ($CaCo_3.MgCo_3$) alone, or may have a honeycomb structure consisting of cordierite covered with the Group IIa element compound, for example, dolomite. The Group IIa element compound may be deposited on the support, for example, by impregnating the support with an aqueous solution of the compound, or by applying a paste of the compound to the support by immersing the support in the paste.

The amount of the poisoning-preventive layer formed on the support is preferably from 5 to 200 g, more preferably from 30 to 150 g, per liter of the support. If the amount of the layer is less than 5 g, the effect of the Group IIa element compound is insufficient. If the amount of the Group IIa element compound exceeds 200 g, the poisoning-preventive layer becomes too thick, resulting in peeling of the layer. The amount of Group IIa element compound in the poisoning-preventive layer is generally 5% or more, preferably 10% or more, in terms of the amount of the Group IIa element based on the amount of the other metal oxides. If the amount of the Group IIa element compound is less than 5%, a sufficient effect cannot be obtained. In any case, the support should be able to endure thermal shock etc., and it is preferable to make the surface area of the support as large as possible for sufficient contact with exhaust gases.

In the second aspect of the present invention, a poisoning-resistant catalyst for exhaust gas converting is provided which comprises a support, a noble metal catalytic component deposited on the support, and a poisoning-preventive layer formed on the side of the catalytic component that is exposed to exhaust gas. The poisoning-preventive layer has a compound containing at least one element selected from the Group IIa elements.

The support may be in the form of pellets or in a monolith form, and it may be made of a ceramic or a metal (including metallic materials having catalytic activity), or may consist of a material coated with a protective layer of γ-alumina etc.

Use of the "compound containing at least one element selected from the Group IIa elements" (hereinafter "Group IIa element compound") is essential in the present invention, because the Si and phosphorus contained in exhaust gases react with the Group IIa elements at temperatures at which the noble metal in the catalyst is used, to form low-melting-point crystals. This prevents penetration of Si and phosphorus into the noble metal located either more downstream of the location of the Group IIa element compound when viewed from the exhaust gas inlet side, or located inside or rather closer than the layer of the Group IIa element compound to the support, on the side not exposed directly to exhaust gases. Thus, the poisoning of the noble metal can be prevented. The Group IIa element compound preferably is a non-oxide, because a non-oxide Group IIa element compound shows excellent poisoning-preventive performance even if it is not heated.

The Group IIa element compound refers to a compound containing one or more elements selected from Mg, Ca, Sr, and the other Group IIa elements which further may contain, for example, $TiO_2$, $Al_2O_3$, in addition to the above compound. It is, however, preferable that the Group IIa element be contained in the poisoning-preventive layer in an amount of 5% by weight or more based on the amount of the ceramics or metals such as $TiO_2$. (Hereinafter, all percents are by weight.) If the content of the Group IIa element is less than 5%, the effect of preventing the poisoning by Si and phoshporus is reduced.

Methods for depositing the Group IIa element compound on a support such as those supports described above are not particularly limited, and the following are mentioned as examples: (1) a method in which a noble metal-supporting catalyst is immersed in a mixed solution containing a Group IIa element compound, and then the resulting catalyst is dried and heat-treated; and (2) a method in which a Group IIa element compound is deposited first on powder particles of $TiO_2$, $Al_2O_3$, or the like, the resulting powder is heat-treated and then an organic binder and a solvent are added thereto to give a slip. Subsequently this slip is applied to a noble metal supporting catalyst by immersion, spraying, or other technique, and then the resulting catalyst is dried and heat-treated.

The poisoning-preventive layer may be formed in various ways. For example, (1) the poisoning-preventive layer may be formed directly on the surface of a catalytic component-supporting support to be used; (2) a porous protective layer may be formed first on the surfaces of a catalytic component-supporting support so as to protect the catalytic component, and then the poisoning-preventive layer may be formed on the protective layer; or (3) in the case of a monolith-type support, the poisoning-preventive layer may be formed on a plane at one part of the exhaust gas inlet side.

The poisoning-preventive layer is formed directly on the support in method (1) above. In method (2) above, the layer is formed on the support indirectly through other nonpoisoning-preventive layer. The poisoning-preventive layer described above is preferably formed as the uppermost layer, but the catalyst of the present invention is not limited thereto. It is also preferable that this poisoning-preventive layer is formed in the amount of 200 g or less per liter of the catalyst in order to prevent the clogging of the noble metal.

One example of the catalyst of the present invention comprises a monolith-type ceramic support and a poisoning-preventive layer which contains the above-described Group IIa element compound and is formed over the entire surface of the support or is formed on the surface of the support at one part of the exhaust gas inlet side, on the side of the catalytic component exposed to exhaust gases. In the case where the poisoning-preventive layer is formed "on the surface of the support at one part", it is preferable that the part should have a thickness extending from the exhaust gas inlet side edge and not smaller than 1/10, particularly 1/5, of the whole length (volume) of the support, for the purpose of ensuring the performance of preventing the poisoning of the catalytic component by Si and phosphorus.

Figure 6:
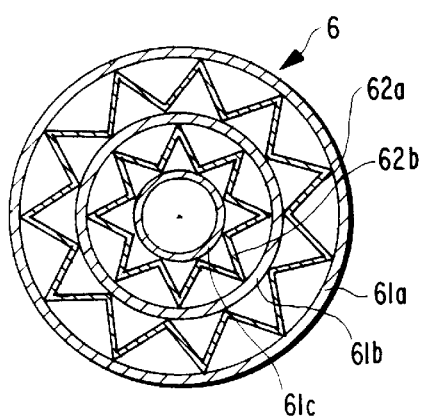
FIG. 6 is a front view of a honeycomb metallic support.

Another example of the catalyst of the present invention comprises a metallic support, a catalytic component deposited on the support, and a poisoning-preventive layer of the above-described Group IIa element compound formed over the catalytic component. The material of this metallic support is not particularly limited as long as it can withstand conditions under which the catalyst is used, and it can support catalytic components directly or indirectly. In general, a heat-resistant alloy having an Al content higher than a normal heat-resistant alloy may be used as the support material. Upon oxidation, such an alloy yields $Al_2O_3$ on the surface thereof, and a catalytic layer may be formed directly on this surface, or an active porous layer such as a $\gamma$-$Al_2O_3$ layer may be first formed on the surface and a catalytic layer is then formed thereon. The shape of the support also is not particularly limited, but a honeycomb-type support as shown in FIG. 6 is preferred.

Still another example of the catalyst of the present invention comprises a metallic catalytic support and a poisoning-preventive layer of a Group IIa element compound formed thereon. This catalytic support may be made of a material having gas-converting catalytic activity. Examples thereof include alloys containing Pt, Pd, Rh, Ag, etc.

As the Group IIa element to be used in the catalyst of the present invention, Ca or Mg may preferably be employed. This is because these two elements are superior with respect to preventing poisoning by Si and phosphorus. Preferred examples of compounds of Ca and Mg include non-oxides such as chlorides, e.g., calcium chloride, nitrates, acetates, carbonates, and the like. Of these, chlorides and nitrates are particularly preferred because they show excellent reactivity with Si and phosphorus at low temperatures. Preferred examples of the Group IIa element compound further include hydrates of the above non-oxides, e.g., $CaCl_2.2H_2O$, and complex compounds, e.g., $CaCO_3.MgCO_3$ (dolomite). Use of these non-oxides, such as chlorides, nitrates, carbonates, etc., containing Ca, Mg, etc. is effective in that since these compounds can be in the form of very fine particles, they can not only prevent Si and phosphorus from passing through the Group IIa elements, but they also exhibit higher activity against Si and phosphorus.

On the other hand, oxides such as CaO, MgO, and the like can react sufficiently with Si and phosphorus to prevent the poisoning of the noble metal catalyst component, only if the catalyst temperature is 500° C. or higher. Therefore, use of such an oxide is inferior because Si and phosphorus adhere to the catalyst surfaces at catalyst temperatures less than 500° C. and, as the catalyst temperature rises above 500° C., part of the Si and phosphorus are changed into oxides to cause clogging. Thus, catalytic performance may be decreased.

Therefore, in the case where such an oxide is used as the poisoning-preventive layer employed in the catalyst of the present invention or in the poisoning-preventive layer-possessing support described above, a means for heating this poisoning-preventive layer may be provided. This heating means is not particularly limited in kind or location as long as it can heat the poisoning-preventive layer. For example, a support having a built-in heating element, such as a heating wire, may be used as the support, or a plate heater or other heater may be placed over the poisoning-preventive layer. Further, in the case of a metallic support, it can be made to generate heat by applying electric current to the support.

In the third aspect of this invention, an exhaust gas converter device is provided which comprises:

a poisoning-preventive material provided on the exhaust gas inlet side, the poisoning-preventive material being either a ceramic material or the poisoning-preventive layer-possessing support as described above, the ceramic material comprising a compound containing at least one element selected from the Group IIa elements or comprising the compound and another ceramic compound, and a catalyst provided on the exhaust gas outlet side, the catalyst comprising a support and a noble metal catalytic component deposited on the support.

The ceramic material may consist of the above-described Group IIa element compound only, or consist of a combination of the Group IIa element compound with $TiO_2$, $Al_2O_3$, or the like. It is, however, preferable that the content of the Group IIa element in this ceramic material be 5% or higher, particularly 20% or higher, to ensure the prevention of poisoning by Si and phosphorus. The poisoning-preventive layer containing the Group IIa element compound may be coated on a support such as, for example, cordierite. In this case, the amount of the poisoning-preventive layer formed on the support is preferably from 5 to 200 g per liter of the support. If the amount of the layer is less than 5 g, the property of preventing poisoning by Si and phosphorus is impaired. Amounts of the layer exceeding 200 g are not preferred in that clogging or peeling may result. As in the case of the poisoning-preventive layer-possessing support and the poisoning-resistant catalyst according to the first and second aspects of the present invention, the content of the Group IIa element in the poisoning-preventive layer of the poisoning-preventive layer-possessing support employed in the converter device of the present invention is preferably 5% or more based on the amount of the ceramic.

The ceramic support that can be used in the poisoning-preventive layer-possessing support in the converter device may be either pellet type or monolith-type. On the exhaust gas outlet side, a conventional catalyst which does not have poisoning resistance may be provided or a poisoning-resistant catalyst as described above may be provided.

In the present invention, the poisoning-resistant part of the converter device preferably extends from the exhaust gas inlet side edge over a length of 1/10th or more, particularly 1/5th or more, of the whole length of the converter device, for the same reason as described above. The support used in this case may be ceramic or metallic.

Another example of the converter device of the present invention comprises the above-described poisoning-resistant catalyst provided on the exhaust gas inlet side and a conventional catalyst provided on the exhaust gas outlet side.

In the fourth aspect of this invention, a poisoning-preventive gasoline composition is provided which comprises a gasoline and the Group IIa element compound contained in the gasoline. This Group IIa element compound is not particularly limited, but is preferably soluble or uniformly dispersible in gasolines, such as, for example, an organic acid salt, an organometallic compound, etc. For the purpose of improving the dispersibility of the compound, the gasoline composition may further contain a dispersant.

In order to produce a good poisoning-preventive effect, the amount of the Group IIa element contained in the gasoline composition is 10 ppm or more of the gasoline, provided that the Group IIa element should be contained in the resulting exhaust gas in an amount of 1 mol % or more based on the amount of Si-containing compounds contained in the exhaust gas.

Preferred examples of the Group IIa element contained in the gasoline composition include Ca and Mg for the same reason as that described above.

By use of the poisoning-resistant catalyst, poisoning-preventive layer-possessing support, exhaust gas converter device employing the catalyst and/or support, or poisoning-preventive gasoline composition, according to the present invention, the Si and phosphorus contained in the exhaust gas are caught by the Group IIa element compound before they reach the noble metal catalytic component, so that the catalytic component is less apt to be poisoned or clogged by silicon or phosphorus. Therefore, according to the present invention, even if the catalyst of the present invention or a conventional catalyst employing the support is used repeatedly, the performance, i.e., exhaust gas catalytic activity performance, of the catalyst can be maintained and prevented from being greatly decreased over a prolonged period of time.

In the case of using a metallic support or a metallic catalytic support, the support shows excellent durability with little cracking, breakage, etc. because the support is metallic.

In the case where the poisoning-preventive layer-possessing support is provided on the upstream in the converter device and a catalyst is provided on the downstream, the initial converting efficiency of the catalyst is not adversely affected and the catalyst exhibits excellent catalytic activity performance.

In the case of using a poisoning-preventive layer-possessing support or a poisoning-preventive layer-possessing catalyst both provided with a heating means, the poisoning-preventive layer shows good performance even if it employs an oxide, such as CaO, as the Group IIa element compound.

The support, which may be of the pellet or monolith-type, is not particularly limited in shape, material, size, etc., and porosity in the case of a ceramic support. For example, the support may be in the form of cylindrical pellets etc. as well as spherical pellets, or may be in the form of a square pillar-shaped monolith or the like as well as in a cylindrical monolith. These monolith-type supports may have a so-called honeycomb structure and one end of such a support may be covered or not covered. The one-end-covered support may be constructed so that exhaust gases can pass through the wall thereof. The material of the support may be either ceramic or metallic, and can be selected from a variety of ceramic and metallic supports according to use and application.

The structure of the metallic support or metallic catalytic support may, for example, normally be a honeycomb structure as shown in FIG. 6. This honeycomb structure 6 consists of an outer cylinder 61a, an intermediate cylinder 61b, an inner cylinder 61c, and, sandwiches between 61a and 61b and between 61b and 61c, corrugated walls 62a and 62b each of which has the shape of a cylindrically-bent corrugated sheet, and on which catalytic components etc. are to be deposited. The cylinders and the corrugated walls may be made of the same material, or may be made from different materials. The corrugated walls 62 are fixed to the cylinders 61a, 61b, 61c at the contact parts by suitable means such as welding. The number of such cylinders (number of layers), the pitch or height of the folds, etc. are not particularly limited.

Furthermore, the heat treatment conditions (heating temperature, heating time, atmosphere, etc.) for forming a layer of a Group IIa element compound are selected in various ways according to the kind of the compound and other factors. In the case of heat treatment in a nitrogen atmosphere, a nitride may be formed in a slight amount according to the kind of the Group IIa element compound used. In the case of an oxidizing atmosphere, an oxide may be formed likewise. Moreover, the poisoning-preventive layer-possessing support may have a structure comprising a honeycomb support having a built-in heating element (heating wire etc.) and a poisoning-preventive layer formed on the support. Alternatively, the poisoning-preventive layer-possessing support may be combined with a plate heater placed over or under the poisoning-preventive layer.

The present invention is explained below in more detail by reference to the following Examples, which should not be construed to be limiting the scope of the invention.

EXAMPLE 1

This example involves the preparation of poisoning-preventive layer-possessing catalysts and converter devices consisting of poisoning-preventive layer-possessing supports combined with conventional catalysts. This example also involves the evaluation of exhaust gas catalytic activity performance of these catalysts and converter devices. It is noted that all of these catalysts were three-way catalysts.

(1) Preparation of Catalysts and Converter Devices

1. Catalyst No. 1

Noble metal-supporting pellets (particle diameter; about 3 mm) were prepared, consisting of an activated alumina support in the form of spherical pellets and Pt (0.13%) and Rh (0.014%) deposited as catalytic components on the support.

To dolomite ($CaCO_3 \cdot MgCO_3$) were then added a water-soluble binder (sodium cellulose glycolate) and water. This mixture was subjected to pulverization and homogenization by means of a pot mill to prepare a slurry, in such a manner that powder particles of 1.5 $\mu$m or smaller comprised 60% or more of all the powder particles. The particle diameter measurement was done with an automatic particle diameter analyzer (manufactured by Shimadzu Corporation, Japan).

Subsequently, the noble metal-supporting pellets described above were immersed in the above-obtained slurry, taken out therefrom, dried, and then heat-treated in a non-oxidizing atmosphere at about 500° to 600° C., thereby preparing catalyst No. 1. This catalyst No. 1 is composed of catalyst particles and, as shown in FIG. 1, each catalyst particle 1 consists of the support 11 as described above, a catalytic component layer 12 formed on the surface of the support 11, and a Group IIa element compound layer 13 formed on the catalytic component layer.

2. Catalyst No. 2

Catalyst No. 2 was prepared in the same manner as catalyst No. 1 except that a slurry to be applied to the support was obtained by immersing an $Al_2O_3$ powder (average particle diameter; 0.5 μm) in an aqueous solution of $CaCl_2$, boiling the mixture to dryness, subsequently heat-treating the residue in an oxidizing atmosphere (air) at about 550° C. (the amount of $CaCl_2$ deposited on the $Al_2O_3$ being about 29 parts by weight (11 parts by weight in terms of the amount of Ca metal) per 100 parts by weight of the $Al_2O_3$), and then adding thereto an organic binder and a solvent.

3. Catalyst No. 3

Catalyst No. 3 was prepared in the same manner as catalyst No. 1 except that $CaCO_3$ was used in place of dolomite ($CaCO_3.MgCO_3$).

4. Catalyst No. 4

Catalyst No. 4 was prepared in the same manner as catalyst No. 1 except that the slurry was put in an atomizer and sprayed over the pellets.

5. Catalyst No. 5

Catalyst No. 5 was prepared in the same manner as catalyst No. 2 except that the slurry was put in an atomizer and sprayed over the pellets.

6. Catalyst No. 6

Catalyst No. 6 was prepared in the same manner as catalyst No. 1 except that the same noble metal-supporting pellets as those used for preparing catalyst No. 1 were immersed in an aqueous solution of $CaCl_2.2H_2O$ under vacuum (−70 mmHg) and the resulting mixture was dried to deposit the Group IIa element compound on the pellets.

7. Catalyst No. 7

Figure 2:
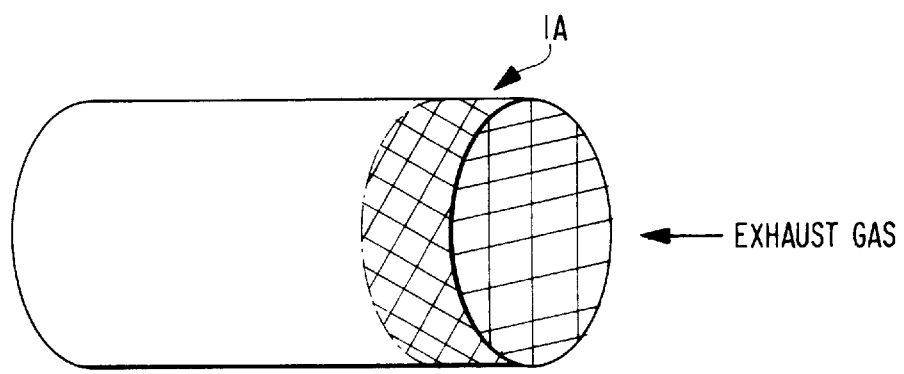
FIG. 2 is a sectional view of the monolith-type catalyst prepared in an Example, as one form of the catalyst of this invention.
Figure 3:
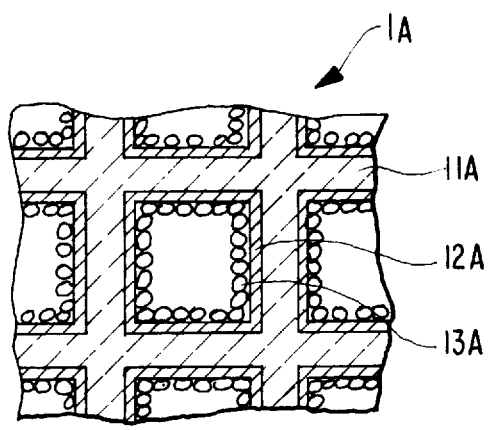
FIG. 3 is an enlarged right side view of a part of the catalyst shown in FIG. 2.

Using the same Group IIa element compound as that used for preparing catalyst No. 1, catalyst No. 7 was prepared in the same manner as catalyst No. 1 except that a monolith-type (honeycomb) support was used in place of the pelleted support. As shown in FIGS. 2 and 3, this monolith-type catalyst 1A consists of a cylindrical honeycomb support 11A made of cordierite (diameter, about 150 mm; length, about 200 mm; cell number, about 400 per square inch; manufactured by NGK Spark Plug Co., Ltd., Japan), a catalytic component layer 12A which is a layer of the above-described catalytic components deposited on the support, and a Group IIa element compound layer 13A formed on the catalytic component layer surface. In the monolith-type catalyst 1A, the part on which the Group IIa element compound has been deposited extends, as shown in FIG. 2, from the exhaust gas inlet side edge over a length that is ⅕ of the whole length of the catalyst, (i.e., that part in the figure which is indicated by slanted lines).

8. Catalyst No. 8

Using the same Group IIa element compound as that used for preparing catalyst No. 2, catalyst No. 8 was prepared in the same manner as catalyst No. 2 except that a monolith-type (honeycomb) support was used in place of the pelleted support. The shape of the monolith-type support used above and the location of the part on which the Group IIa element compound is deposited are the same as in catalyst No. 7.

9. Catalyst No. 9

Using the same Group IIa element compound as that used for preparing catalyst No. 6, catalyst No. 9 was prepared in the same manner as catalyst No. 6 except that a monolith-type (honeycomb) support was used in place of the pelleted support. The shape of the monolith-type support used above and the location of the part on which the Group IIa element compound is deposited are the same as in catalyst No. 7.

10. Catalyst No. 10

Catalyst No. 10 was prepared in the same manner as catalyst No. 6 except that the same noble metal-supporting pellets as those used for preparing catalyst No. 1 were immersed in an aqueous solution of $Ca(NO_3)_2.4H_2O$ under vacuum (−70 mmHg) and the resulting mixture was dried to deposit the Group IIa element compound on the pellets.

11. Catalyst No. 11

Catalyst No. 11 was prepared in the same manner as catalyst No. 10 except that the same monolith-type support as that used for preparing catalyst No. 7 was used in place of the pellets.

12. Catalyst No. 12

Catalyst No. 12 was prepared in the same manner as catalyst No. 9 except that the Group IIa element compound was deposited throughout the whole length of the catalyst.

13. Catalyst No. 13

Catalyst No. 13 was prepared in the same manner as catalyst No. 11 except that the Group IIa element compound was deposited throughout the whole length of the catalyst.

14. Comparative Catalyst Nos. 1 and 2

Comparative catalyst No. 1 is a conventional pellet-type catalyst (not coated with a Group IIa element compound). Comparative catalyst No. 2 is the same as the above-described catalyst No. 7 except that the part on which the Group IIa element compound has been deposited extends from the honeycomb's exhaust gas inlet side edge over a length that is ¹⁄₂₀ of the whole length of the catalyst.

15. Converter Device No. 14

Figure 5:
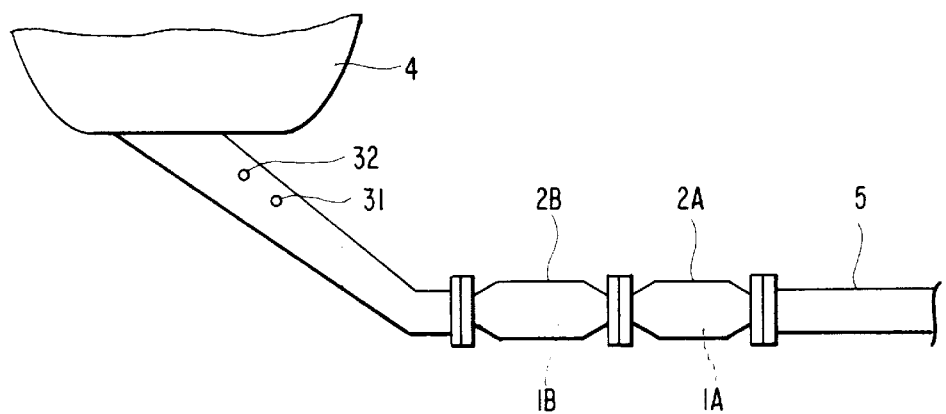
FIG. 5 is a diagrammatic view illustrating an installed converter device (No. 14) as one form of the converter device according to the third aspect of this invention.

A monolith-type support having the same shape as that of the support used for preparing catalyst No. 7 was prepared from dolomite ($CaCO_3.MgCO_3$), and this support was used as a poisoning-preventive structure 1B as follows. As shown in FIG. 5, the structure 1B was placed in a predetermined metallic shell 2B, which was then installed on the exhaust gas inlet side. Thereafter, a plurality of pellets of catalyst No. 1 which are not coated with a Group IIa element compound were packed in a predetermined metallic shell 2A, which was then installed on the exhaust gas outlet side, preparing a converter device. This converter device No. 14 was installed in a predetermined position.

16. Converter Device No. 15

A poisoning-preventive layer-possessing support was prepared by immersing the same honeycomb support as that used for preparing catalyst No. 7 in the same $CaCl_2$ solution as that used for preparing catalyst No. 2. The resulting support was placed in a shell 2B in the same manner as converter device No. 14 to prepare converter device No. 15, which was then installed likewise.

17. Converter Device No. 16

On the same honeycomb support as that used for preparing catalyst No. 7, a wash coat consisting of $\gamma Al_2O_3$ was deposited. The resulting support was immersed in the same CaCl$_2$ solution as that used for preparing catalyst No. 9, to prepare a poisoning-preventive layer-possessing support. The resulting support was placed in a shell 2B in the same manner as converter device No. 14 thereby to prepare converter device No. 16, which was then installed likewise.

18. Converter Device No. 17

A poisoning-preventive layer-possessing support was prepared by immersing the same pelleted support as that used for preparing catalyst No. 1 in the same CaCl$_2$ solution as that used for preparing catalyst No. 9. The resulting support was placed in a shell 2B in the same manner as converter device No. 14 to prepare converter device No. 17, which was then installed likewise.

19. Converter Device No. 18

A poisoning-preventive layer-possessing support was prepared by immersing the same pelleted support as that used for preparing catalyst No. 1 in the same Ca(NO$_3$)$_2$ solution as that used for preparing catalyst No. 10. The resulting support was placed in a shell 2B in the same manner as converter device No. 14 thereby to prepare converter device No. 18, which was then installed likewise.

20. Converter Device No. 19

A paste prepared by mixing a CaO powder, a water-soluble binder (sodium cellulose glycolate), and water was applied on the same pelleted support as that used for preparing catalyst No. 1, to prepare a poisoning-preventive layer-possessing support. The thus-obtained support was placed in a shell 2B in the same manner as converter device No. 14 to prepare converter device No. 19, which was then installed likewise.

(2) Performance Test

Figure 4:
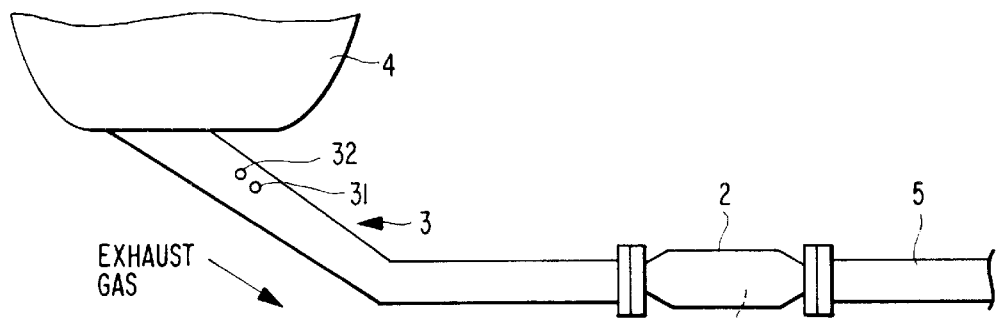
FIG. 4 is a diagrammatic view illustrating an installed catalytic converter obtained by placing a catalyst prepared in an Example in a shell.

As shown in FIG. 4, each catalyst 1 of the above-described catalysts Nos. 1 to 13 and comparative catalysts Nos. 1 and 2 was placed in a predetermined metallic shell 2 to prepare a converter device, which was then installed in a predetermined position. Likewise, each of converter devices Nos. 14 to 19 was installed as shown in FIG. 5.

Thereafter, the engine was operated at 3,000 rpm and a silicone oil was injected from a silicone injection hole 31 in the wall of an exhaust pipe 3 for 1 hour at a rate of 20 cc/hr. This exhaust pipe 3 was provided therein with an oxygen sensor at an oxygen sensor-inserting hole 32 and the oxygen concentration was determined by this sensor, so that the air-fuel ratio was maintained around the theoretical value (14.7:1). In FIG. 4, numeral 4 denotes an exhaust manifold and 5 a main muffler.

After the above test, the catalyst or converter device was installed in a vehicle for catalyst evaluation, and the vehicle was operated in the LA4 (HOT 505) mode to measure the converting efficiencies for CO and NO$_x$, thus evaluating each catalyst and converter device.

The results obtained are summarized in Tables 1(A) and 1(B), in which the converting efficiencies of the converter devices employing catalysts Nos. 1 to 13 and comparative catalysts Nos. 1 and 2 are shown in Table 1(A), while those of the converter devices Nos. 14 to 19 employing poisoning-preventive layer-possessing supports are shown in Table 1(B). The converting efficiency was calculated using the following equation after the CO or NOx concentration A$_l$ of the exhaust gas before passing through the catalyst and the CO or NOx concentration A$_2$ of the exhaust gas after passing through the catalyst were determined.

Converting efficiency=[(A$_1$–A$_2$)/A$_1$]×100 (%)

TABLE 1(A)

| Catalyst | Converting Efficiency (%) | |
| --- | --- | --- |
|  | CO | NOx |
| No. 1 | 83 | 91 |
| No. 2 | 89 | 94 |
| No. 3 | 85 | 93 |
| No. 4 | 84 | 93 |
| No. 5 | 89 | 95 |
| No. 6 | 89 | 94 |
| No. 7 | 86 | 93 |
| No. 8 | 88 | 95 |
| No. 9 | 90 | 94 |
| No. 10 | 87 | 92 |
| No. 11 | 88 | 94 |
| No. 12 | 89 | 95 |
| No. 13 | 89 | 94 |
| Comparative No. 1 | 53 | 60 |
| Comparative No. 2 | 72 | 76 |

TABLE 1(B)

| Converter Device | Converting Efficiency (%) | |
| --- | --- | --- |
|  | CO | NOx |
| No. 14 | 80 | 86 |
| No. 15 | 86 | 93 |
| No. 16 | 87 | 95 |
| No. 17 | 87 | 94 |
| No. 18 | 86 | 93 |
| No. 19 | 75 | 83 |

(3) Performance Evaluation

Compared to the conventional catalyst (comparative catalyst No. 1), catalysts Nos. 1 to 13 and converter devices Nos. 14 to 19 showed greatly improved CO or NOx converting efficiencies of about 1.6 to 1.8 times those of the conventional catalyst. The reason for this is that the noble metals, such as Pt, Rh, etc., as the catalytic components in the catalysts and converter devices according to the present invention performed their normal functions without suffering poisoning or clogging. Further, catalyst No. 8 showed better performance than comparative catalyst No. 2. This indicates that it is preferable that the Group IIa element compound be deposited on the honeycomb over a length which extends from the honeycomb's exhaust gas inlet side and is 1/10 or more of the whole length of the honeycomb.

EXAMPLE 2

This example is concerned with the preparation and evaluation of poisoning-preventive layer-possessing supports.

(1) Preparation of Poisoning-Preventive Layer-Possessing Supports and Converter Devices Each of the supports having shapes and sizes as shown in Tables 2(A) and 2(B) and made of materials as shown in the tables was immersed in a paste consisting of a predetermined concentration of a Group IIa element compound, a ceramic powder, both shown in the table, and BMS (butyral resin) as an organic binder. The support was then taken out from the paste, and air was blown at the support to form a uniform coating film. The viscosity of each paste used above was regulated at 100 cps or less. Thereafter, the coated support was dried sufficiently at 100° C., and then heat-treated in the air at 500° to 600° C., thereby preparing a poisoning-preventive layer-possessing support.

Figure 7:
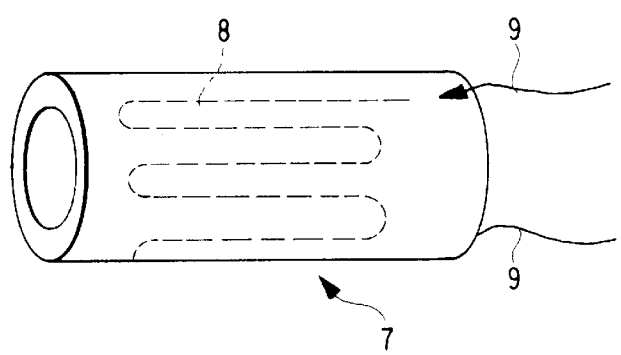
FIG. 7 is a perspective view of a cylindrical ceramic heater.

With respect to poisoning-preventive layer-possessing supports Nos. 34 and 35, a ceramic heater was used to heat the poisoning-preventive layers at 500° to 600° C. As shown in FIG. 7, this ceramic heater 7 is a cylindrical tube (inner diameter 100 mmφ, length 200 mm) having a heating Pt electrode (heating element) 8 which is a built-in zigzag electrode and also having lead wires 9, 9. In the case where the above-described supports were pelleted supports, the cylindrical heater was packed with a plurality of pellets, with both openings of the cylinder being covered with a honeycomb lid made of cordierite. Subsequently, a CA wire (K thermocouple, 0.6 mmφ) was inserted into the pellets in the cylinder, and the applied voltage was regulated so that the pellets were heated at 400°±20° C. before the test. During the test of the pellets, their temperature rises to about 500° to 600° C.

Each of the thusly obtained poisoning-preventive layer-possessing supports was wrapped in a mat made of ceramic and placed in a predetermined shell, which was then installed in the same manner as that for the above-described converter device No. 14. On the downstream side of the support-containing shell, a conventional catalyst placed in a predetermined shell was installed, the catalyst being the same as catalyst No. 7 except that it did not have a poisoning-preventive layer of a Group IIa element compound. Each of the prepared converter devices was subjected to the same Si poisoning test as in Example 1. Thereafter, the resulting conventional catalysts were taken out from the converter devices and installed in a vehicle for catalyst evaluation, and the degree of poisoning of each catalyst was evaluated in terms of converting efficiency. The results obtained are summarized in Tables 2(A) and 2(B), in which "Ca concentration (%)" means the weight of Ca per weight of the other metal oxides.

TABLE 2(A)

| | Support | | | Poisoning-Preventive Layer | | | Converting Efficiency | | |
|---|---|---|---|---|---|---|---|---|---|
| No. | Kind | Material | Outer Diameter (mmφ) | Group IIa Element Compound | Ceramic | Concentration (%) | CO (%) | NOx (%) | Heater |
| 21 | Pellet | Activated alumina | 2 | $CaCl_2 \cdot 2H_2O$ | γ-alumina | 5 | 82 | 87 | None |
| 22 | " | Activated alumina | 2 | " | " | 25 | 89 | >90 | " |
| 23 | " | Activated alumina | 2 | $Ca(NlO_3)_2 \cdot 4H_2O$ | " | 15 | 89 | >90 | " |
| 24 | " | Activated alumina | 2 | " | $TiO_2$ | 15 | 88 | >90 | " |
| 25 | " | Activated alumina | 2 | $MgCl_2 \cdot 6H_2O$ | γ-alumina | 20 | 87 | >90 | " |
| 26 | " | Activated alumina | 3 | $CaCl_2 \cdot 2H_2O$ | " | 5 | 81 | 86 | " |
| 27 | " | Activated alumina | 3 | " | " | 25 | 88 | >90 | " |
| 28 | " | Activated alumina | 3 | $Ca(NO_3)_2 \cdot 4H_2O$ | " | 15 | 88 | >90 | " |
| 29 | " | Activated alumina | 3 | | dolomite | — | 83 | 89 | " |
| 30 | " | Activated alumina | 3 | $Ca(NO_3)_2 \cdot 4H_2O$ | $TiO_2$ | 5 | 82 | 86 | " |
| 31 | " | Activated alumina | 3 | " | " | 25 | 89 | >90 | " |
| 32 | Pellet | Activated alumina | 3 | $MgCl_2 \cdot 6H_2O$ | γ-alumina | 10 | 86 | >90 | None |
| 33 | " | Activated alumina | 3 | $Mg(NO_3)_2 \cdot 6H_2O$ | " | 15 | 85 | >90 | " |
| 34 | " | Activated alumina | 3 | CaO | " | 10 | 87 | >90 | Present |
| 35 | " | Activated alumina | 3 | " | " | 20 | 89 | >90 | " |
| Comparative 3 | " | Activated alumina | 3 | " | " | 20 | 75 | 82 | None |
| 36 | " | Activated alumina | 4 | $CaCl_2 \cdot 2H_2O$ | " | 5 | 79 | 84 | " |
| 37 | " | Activated alumina | 4 | " | " | 15 | 85 | >90 | " |
| 38 | " | Activated alumina | 5 | " | " | 5 | 77 | 83 | " |
| 39 | " | Activated alumina | 5 | " | " | 25 | 82 | 87 | " |

TABLE 2(B)

| | Support | | | Poisoning-Preventive Layer | | | Converting Efficiency | | |
|---|---|---|---|---|---|---|---|---|---|
| No. | Kind | Outer Material | Diameter (mm$\phi$) | Group IIa Element Compound | Ceramic | Concentration (%) | CO (%) | NOx (%) | Heater |
| 40 | Pellet | Dolomite | 2 | Ca(NO$_3$)$_2$.4H$_2$O | γ-alumina | 15 | 89 | >90 | None |
| 41 | " | " | 2 | " | TiO$_2$ | 15 | 89 | >90 | " |
| 42 | " | " | 4 | " | γ-alumina | 15 | 87 | >90 | " |
| 43 | Honey-comb | Cordierite | 150 | CaCl$_2$.2H$_2$O | " | 5 | 80 | 87 | " |
| 44 | Honey-comb | " | " | " | " | 25 | 86 | >90 | " |
| 45 | Honey-comb | " | " | Ca(NO$_3$)$_2$.4H$_2$O | " | 15 | 87 | >90 | " |
| 46 | Honey-comb | " | " | | dolomite | — | 84 | 89 | " |
| 47 | Honey-comb | " | " | Ca(NO$_3$)$_2$.4H$_2$O | TiO$_2$ | 15 | 87 | >90 | " |
| 48 | Honey-comb | " | " | MgCl$_2$.6H$_2$O | γ-alumina | 20 | 85 | >90 | " |
| 49 | Honey-comb | Dolomite | " | | dolomite | — | 83 | 89 | " |
| 50 | Honey-comb | " | " | Ca(NO$_3$)$_2$.4H$_2$O | γ-alumina | 15 | 89 | >90 | " |
| 51 | Pellet | " | 3 | CaCl$_2$ | | 10 | 85 | >90 | " |
| Comparative 4 | " | Alumina | 3 | | None | | 74 | 79 | " |
| Comparative 5 | Honey-comb | Cordierite | 150 | | None | | 73 | 79 | " |

In the tables, comparative supports Nos. 4 and 5 did not have a poisoning-preventive layer, while comparative support No. 4 did not employ any monolithic support. Support No. 32 according to the present invention was not provided with a heating means.

The results show the following. The supports of the present invention (Nos. 21 to 51) were superior in the catalyst's converting efficiencies for both CO and NOx compared with the comparative supports (Nos. 3 to 5). Although the supports of this invention showed slightly poor poisoning-preventive properties at a Ca concentration of 5 wt % (Nos. 21, 26, 30, 36, and 38), they showed especially good performance at Ca concentrations of 10 to 20%. The supports of the present invention employing Group IIa element compounds other than CaO showed good performance even without a heating means. However, in the case of the supports employing CaO, poor converting efficiencies resulted when the support was not heated (comparative support No. 3), while good converting efficiencies were obtained when the supports were heated (supports Nos. 34 and 35). In the case of the pelleted supports, the poisoning-preventive effect was weakened as the pellet diameter increased from 2 mm$\phi$ to 5 mm$\phi$ and the space volume increased accordingly (as apparent, for example, from a comparison among Nos. 21 and 22, Nos. 26 and 27, and Nos. 38 and 39).

EXAMPLE 3

In this example, the property of preventing poisoning by phosphoric acid was examined. In place of the silicone oil used in the preceding Examples, a 30% solution of phosphoric acid (reagent-grade orthophosphoric acid) was injected for 1 hour at a rate of 20 cc/hr into similar converter devices employing the catalysts and supports shown in Table 3, in which the respective catalysts and supports are the same as those described in Tables 1 and 2. That is, catalyst Nos. 2 and 8, which were the same as those in Example 1, and supports Nos. 22, 31, 45, and 50, which were the same as those in Example 2, were used to prepare converter devices in the same manner as in Examples 1 and 2, respectively. After completion of the injection of phosphoric acid, converting efficiency measurements were conducted likewise. The results obtained are shown in Table 3, in which comparative catalyst No. 6 and comparative support No. 7 did not have a poisoning-preventive layer.

The results in Table 3 show that the catalysts of the present invention (Nos. 2 and 8) and the supports of the present invention (Nos. 22, 31, 45, and 50) showed good performance compared to comparative Nos. 6 and 7. This indicates that the catalyst and poisoning-preventive layer-possessing support of the present invention are excellent not only in the property of resisting or preventing the poisoning by Si, but also in the property of resisting or preventing poisoning by phosphorus compounds.

TABLE 3

| | | Converting Efficiency | | |
|---|---|---|---|---|
| No. | Catalyst or Support | CO (%) | NOx (%) | |
| 2 | Catalyst | ≧90 | ≧90 | Invention |
| 8 | " | ≧90 | ≧90 | " |
| 22 | Support | ≧90 | ≧90 | " |
| 31 | " | ≧90 | ≧90 | " |
| 45 | " | 89 | ≧90 | " |
| 50 | " | 89 | ≧90 | " |
| 6 | Catalyst | 74 | 84 | Comparative |
| 7 | Support | 74 | 84 | " |

While the invention has been described in detail and with reference to specific embodiments thereof, the present invention is not limited to these embodiments and various changes and modifications can be made therein according to particular uses and applications without departing from the spirit and scope thereof.

What is claimed is:

1. A poisoning-resistant catalyst for exhaust gas converting comprising:

a support having an exhaust gas inlet side, a noble metal catalytic component deposited on the support, and a poisoning-preventive layer formed on top of the catalytic component or formed on top of the catalytic component at the exhaust gas inlet side of the support, wherein said poisoning-preventive layer comprises at least one non-oxide compound of the Group IIa elements of the Periodic Table and at least one oxide, wherein the amount of the at least one non-oxide compound of the Group IIa elements of the Periodic Table is at least 5% based on the amount of the at least one oxide, wherein said compound of the Group IIa elements of the Periodic Table is selected from the group consisting of dolomite, calcium chloride, magnesium chloride, calcium nitrate, magnesium nitrate, calcium carbonate, and magnesium carbonate, wherein said dolomite is $CaCO_3 \cdot MgCo_3$.

2. A poisoning-resistant catalyst as in claim 1, wherein the poisoning preventive layer is formed in an amount of 200 grams or less per liter of catalyst.

3. A poisoning-resistant catalyst for exhaust gas converting consisting essentially of:

a support having an exhaust gas inlet side, a noble metal catalytic component deposited on the support, and a poisoning-preventive layer formed on top of the catalytic component or formed on top of the catalytic component at the exhaust gas inlet side of the support, wherein said poisoning-preventive layer comprises at least one non-oxide compound of the Group IIa elements of the Periodic Table and at least one oxide, wherein the amount of the at least one non-oxide compound of the Group IIa elements of the Periodic Table is at least 5% based on the amount of the at least one oxide, wherein said compound of the Group IIa elements of the Periodic Table is selected from the group consisting of dolomite, calcium chloride, magnesium chloride, calcium nitrate, magnesium nitrate, calcium carbonate, and magnesium carbonate, wherein said dolomite is $CaCO_3 \cdot MgCO_3$.

* * * * *